Dec. 12, 1961     I. K. DORTORT     3,013,200

CURRENT BALANCING REACTORS FOR RECTIFIER ELEMENTS

Filed June 30, 1959     5 Sheets-Sheet 1

INVENTOR.
ISADORE K. DORTORT

BY *Ostrolenk, Faber, Gerb*
*and Soffen*

ATTORNEYS

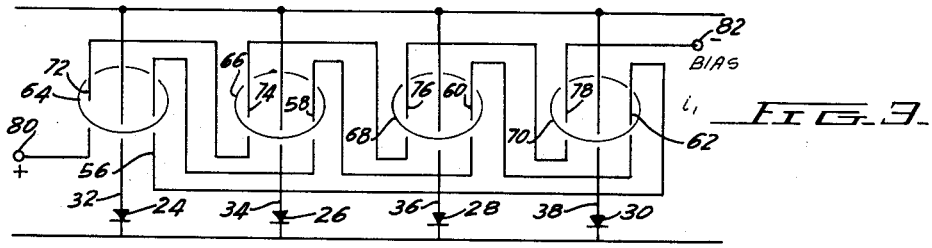
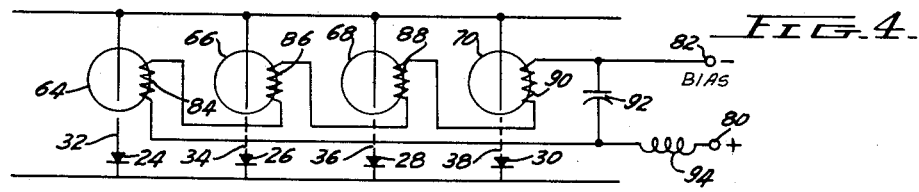
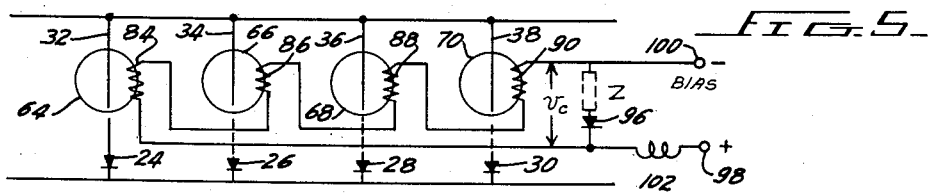
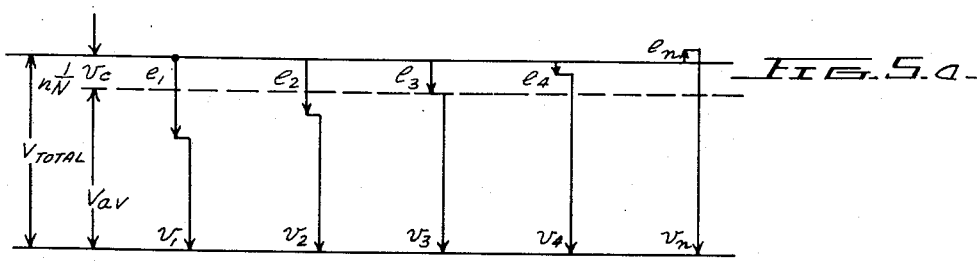
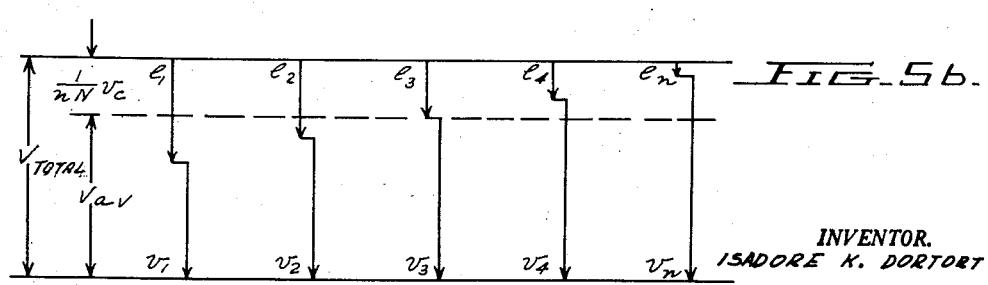
INVENTOR.
ISADORE K. DORTORT

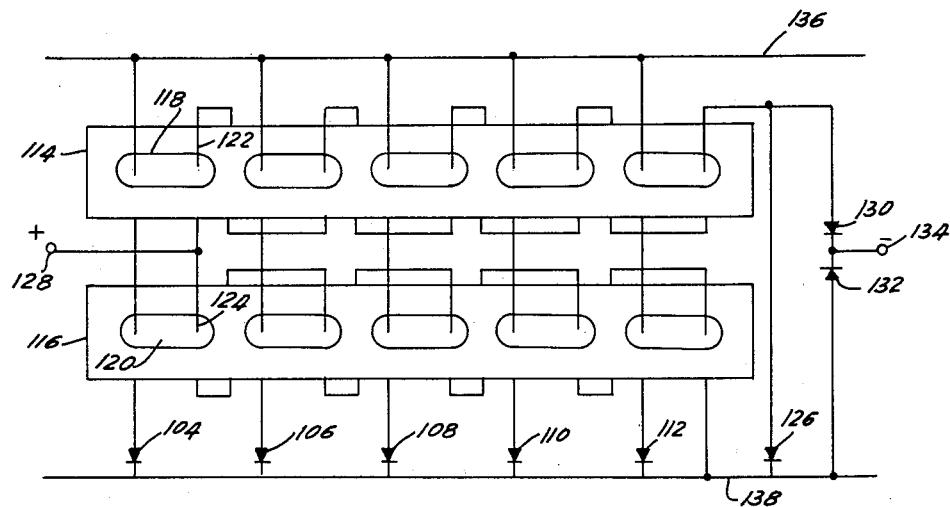
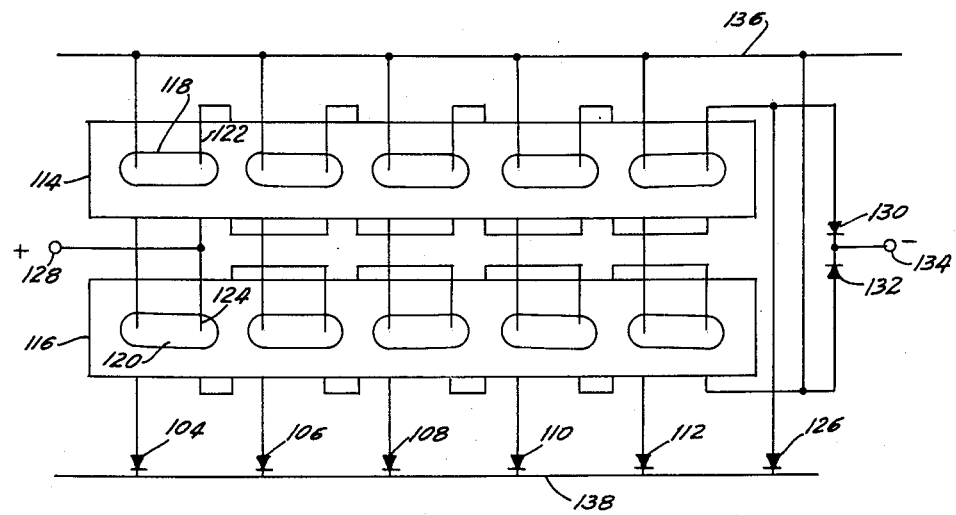

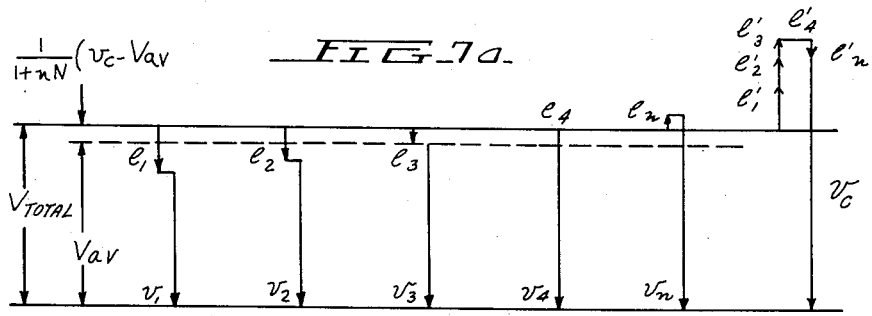
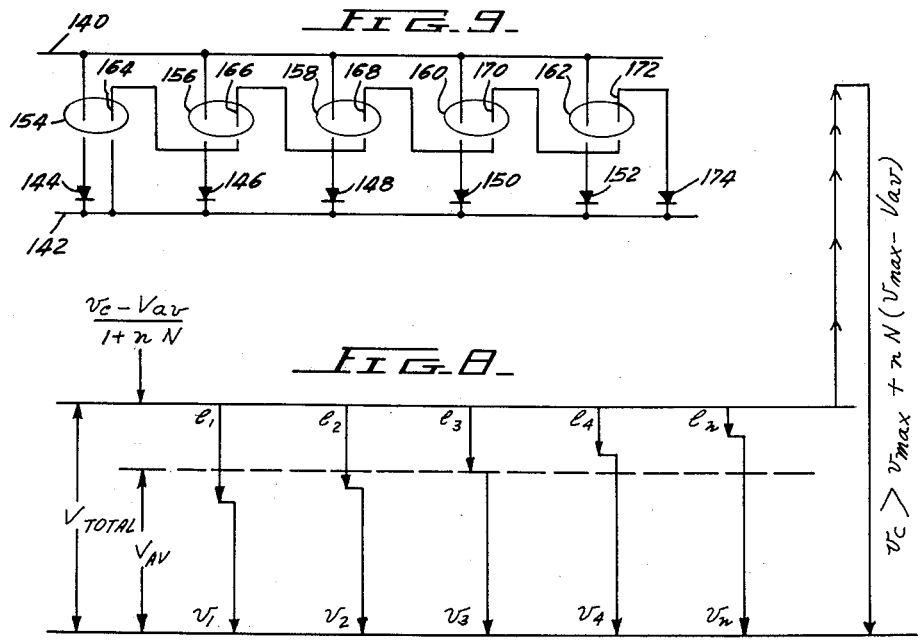
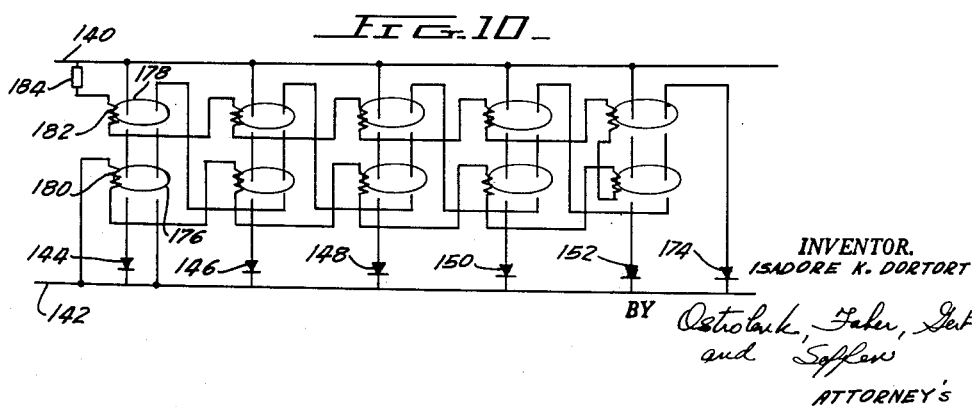

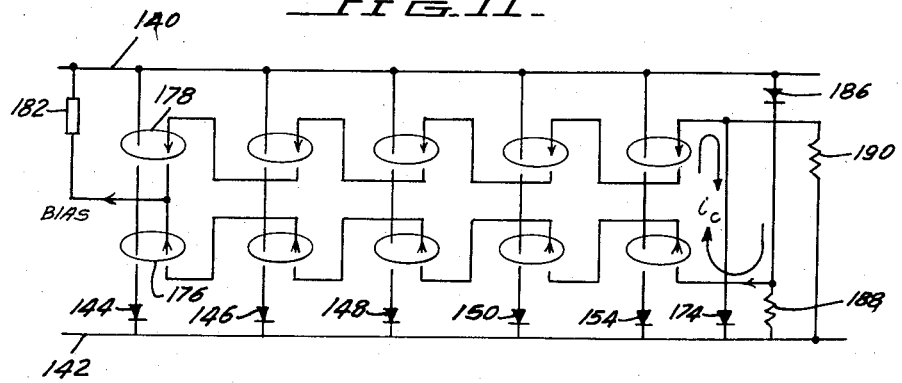
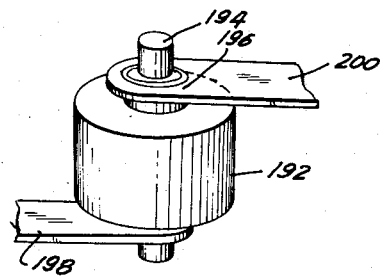
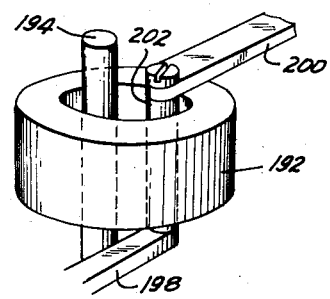
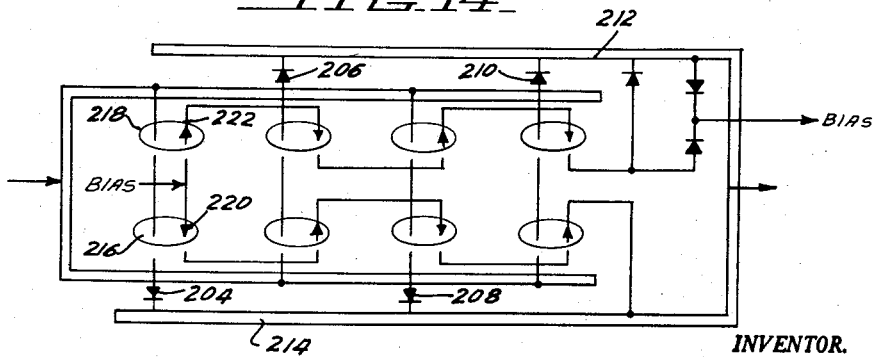

United States Patent Office 3,013,200
Patented Dec. 12, 1961

3,013,200
CURRENT BALANCING REACTORS FOR
RECTIFIER ELEMENTS
Isadore K. Dortort, Philadelphia, Pa., assignor to I-T-E
Circuit Breaker Company, Philadelphia, Pa., a corporation of Pennsylvania
Filed June 30, 1959, Ser. No. 824,054
17 Claims. (Cl. 321—27)

This application is a continuation-in-part of my copending application Serial No. 628,324 filed December 14, 1956, and entitled "Current Balancing Reactors for Rectifier Elements" and relates to a current balancing reactor structure wherein the currents of a plurality of parallel connected diodes are maintained balanced through comparison to a common reference means.

Each of a plurality of parallel connected diodes are connected in series with a reactor and each of these reactors are provided with an auxiliary winding. The auxiliary windings of the reactors are connected in series with one another. When there is a current unbalance because of the different forward conducting characteristics of the various diodes as explained in my above noted application Serial No. 628,324, a voltage will be induced in the reactor auxiliary winding and thus in the circuit including the plurality of series connected auxiliary windings. The remaining auxiliary windings will then operate to induce an opposing voltage and thus affect the current through the diodes associated therewith whereby a current balance between all of the diodes will ultimately be achieved. If desired, the common reference circuit including the plurality of auxiliary windings may include a diode for obtaining a biasing current as will be set forth more fully hereinafter or may be an enclosed circuit without a diode or biasing current for preventing D.-C. saturation of the reactor cores.

Accordingly, the primary object of my invention is to provide a novel current balancing circuit.

Another object of my invention is to provide a novel current balancing circuit for parallel connected diodes wherein the curent through each of the diodes is compared to a common reference circuit.

These and other objects of my invention will become apparent from the following description when taken in conjunction with the drawings in which:

FIGURE 1 shows a first embodiment of my novel common reference circuit for balancing the current between a plurality of parallel conected diodes.

FIGURE 2 schematically illustrates the circuit of FIGURE 1 for easier analysis of the circuit.

FIGURE 3 illustrates the circuit of FIGURE 1 when modified to include a D.-C. bias.

FIGURE 4 illustrates one manner in which the circuit of FIGURE 1 and the D.-C. bias of FIGURE 3 can be applied to a single auxiliary winding of the various balancing reactors.

FIGURE 5 illustrates the circuit of FIGURE 4 where the reference circuit includes a diode element.

FIGURE 5a shows a chart of the voltages on the main windings of the reactors of FIGURE 5 and are related to the voltage on the various auxiliary windings by the turns ration N of the reactor.

FIGURE 5b illustrates the manner in which the various circuit voltages of FIGURE 5 as shown in FIGURE 5a may be altered by the increase of the impedance Z of FIGURE 5 to assure that $$\frac{1}{nN}v_\text{o}$$

is large enough so that all the induced voltages $e_\text{n}$ are in the same direction.

FIGURE 6 illustrates the manner in which a double reactor construction of flat punched laminations may be applied to have the voltage distribution of FIGURE 5a and shows how a flux resetting bias can be impressed on the reference windings.

FIGURE 7 is similar to FIGURE 6 and differs therefrom in that the reference circuit carries a portion of the total power current.

FIGURE 7a is a chart of the various voltages in the reference and main circuits of FIGURE 7 in which either direction of magnetization is permissible.

FIGURE 8 illustrates the voltage chart of a circuit similar to that of FIGURE 7 wherein the voltage drop across the diode and series impedance in the reference circuit is larger than that of any of the other diodes.

FIGURE 9 shows a self-contained balancing reference circuit wherein a single power diode closes the circuit.

FIGURE 10 illustrates one manner of obtaining a bias for flux resetting of a double reactor core construction following the structure of FIGURE 9.

FIGURE 11 illustrates a circuit connection for obtaining a D.-C. bias without the addition of a separate bias winding as required in the circuit of FIGURE 10.

FIGURE 12 illustrates a reactor construction which can be used for the balancing reactor of the invention where the reactor core is formed of a spiral wound core and the winding of the auxiliary circuit is concentric to the main diode conductor winding.

FIGURE 13 illustrates a reactor construction where the auxiliary winding and main diode conductor winding are positioned adjacent upon one another.

FIGURE 14 schematically illustrates the physical mounting of reactors such as those shown in FIGURES 12 and 13 in a circuit using my novel common reference balancing circuit.

Figure 1:
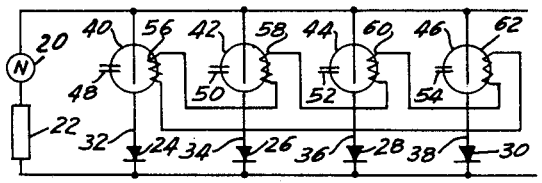

Referring now to FIGURE 1, I have illustrated a rectifier system wherein an A.-C. voltage source 20 delivers D.-C. power to load 22 by means of the rectifier system including diodes 24, 26, 28 and 30 which are connected in parallel with one another and in series with the A.-C. source 20 and D.-C. load 22 by diode conductors 32, 34, 36 and 38, respectively.

Each of diode conductors 32 through 38 have associated therewith a reactor core 40, 42, 44 and 46 respectively. These reactor cores include relatively large air gaps schematically illustrated as air gaps 48, 50, 52 and 54, respectively. The purpose of reactors 40 through 46 is to cause a current balance between the parallel connected diodes 24 through 30, which would normally conduct different currents because of their different forward conducting characteristics.

As seen in my above noted copending application Serial No. 628,324, the reactors may be so arranged that one core couples an adjacent pair of conductors. In accordance with the present invention, however, a common reference circuit is used and is formed by series connected auxiliary windings 56, 58, 60 and 62 of reactor cores 40 through 46, respectively.

Figure 2:
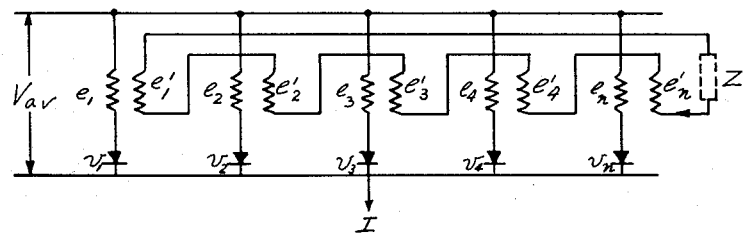
FIGURE 2a illustrates the various voltages induced in the auxiliary reactor windings of the common reference circuit of FIGURE 2.
FIGURES 2b, 2c and 2d illustrate current conditions as a function of time for any of the balancing reactors of a three-phase system.
Figure 2A:
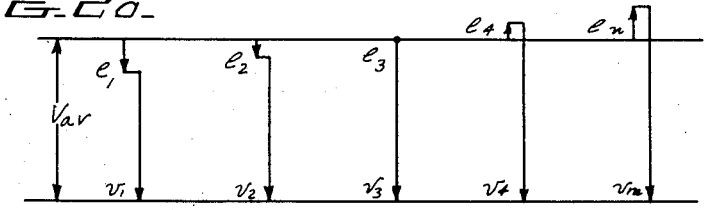

To understand the operation of this circuit, FIGURE 2 schematically illustrates the circuit of FIGURE 1 for any number $n$ of diodes while FIGURE 2a presents a graph of the various voltages in the circuit of FIGURE 2.

In the circuit of FIGURE 2, the letter $v$ with a subscript indicates the forward voltage across a particular diode. Thus, in the circuit of FIGURE 1, voltages $v_1$, $v_2$, $v_3$ and $v_4$ correspond to the forward voltages across diodes 24 through 30 respectively. The voltage $e$ with a subscript refers to the voltage across the diode conductor associated with a respective diode in view of a flux change in the core surrounding this diode conductor. By way of example, voltages $e_1$, $e_2$, $e_3$ and $e_4$ illustrate the voltages induced in diode conductors 32, 34, 36 and 38 respectively of FIGURE 1. The voltages $e'$ with a subscript in FIGURE 2 then refer to the voltages induced in the auxiliary windings of the reference circuits so that voltages $e'_1$, $e'_2$, $e'_3$ and $e'_4$ would identify the voltages on windings 56, 58, 60 and 62 respectively of FIGURE 1.

As is illustrated in FIGURE 2a, the various voltages $v_1, v_2 \ldots, v_n$ will differ according to the forward voltage characteristic of the particular diode in the circuit. Assuming, for simplicity of analysis, that the impedance of the closed reference circuit of FIGURE 2 which includes the auxiliary reactor windings is zero, it necessarily follows that $e'_1 + e'_2 + e'_3 \ldots, + e'_n = 0$. Of necessity then, these induced voltages must occur in both directions in order to balance out as illustrated in FIGURE 2a. This is more easily seen if it is assumed that $e = e'$.

Since the current in the auxiliary windings of the common reference circuit is necessarily the same for all of the windings, the ampere turns in any one diode cannot differ from the ampere turns of its associated secondary winding by more than the magnetizing current of the magnetic core. Accordingly, a balance within this limit is achieved in the circuit of FIGURE 1.

Figure 2B:
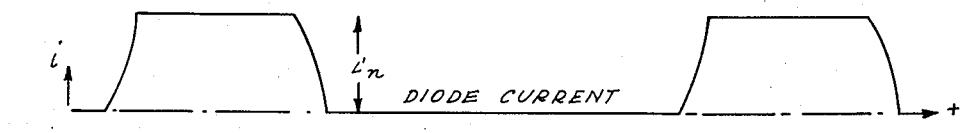
Figure 2C:
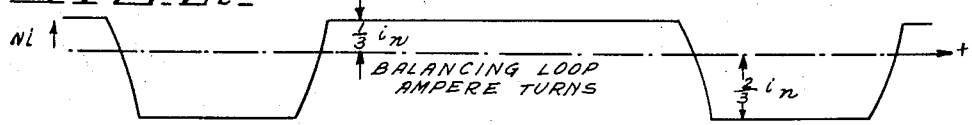
Figure 2D:
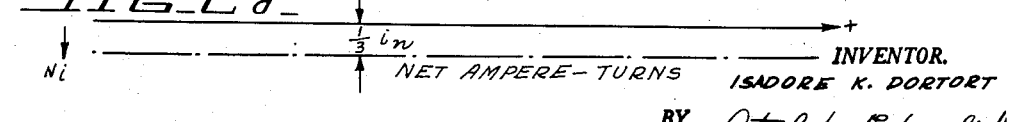

The cores illustrated in FIGURE 1 have relatively large air gaps to prevent D.-C. saturation. That the cores would otherwise be driven to saturation is illustrated in FIGURE 2b, 2c and 2d which show the the current conditions of the reactor associated with a diode such as diode 24 of FIGURE 1 where source 20 may be considered a source for one phase of a three-phase system. FIGURE 2b shows the typical current carried by diode conductor 32 of diode 24 under these conditions. It is not possible to induce D.-C. voltages or currents by purely magnetic means and therefore, no D.-C. component of current can exist in the balancing loop or circuit of FIGURE 1. Therefore, FIGURE 2c illustrates the current induced in auxiliary winding 56 of reactor core 40 as an A.-C. current. FIGURE 2d illustrates the net ampere turns applied to core 40 in view of the unidirectional current $i_n$ through diode conductor 32 and the induced alternating current of winding 56. As seen in FIGURE 2d, there will be a net unbalance of one-third $i_n$ tending to saturate the core. Because of this, a high permeance magnetic core is not feasible. Accordingly, in the circuit of FIGURE 1, it is necessary to provide a large air gap to prevent saturation.

Because a large air gap is required, the reactors 40 through 46 are large, although the system is simple and has no extraneous components or auxiliary power source.

In order to provide a more economical system it is possible to provide auxiliary means for reducing or resetting the residual flux of the various reactor cores and thus use small, high permeability cores.

FIGURE 3 shows one type of auxiliary circuit which may be applied to parallel connected diodes 24, 26, 28 and 30 and their adjacent conductors 32, 34, 36 and 38 respectively whereby cores 40 through 46 of FIGURE 1 may be replaced by high permeability cores 64, 66, 68 and 70 respectively. The cores 64 through 70 continue to have the closed reference circuit including straight-through auxiliary windings 56, 58, 60 and 62, but an additional biasing circuit including straight-through windings 72, 74, 76 and 78 is added to cores 64 through 70 respectively. Each of these windings 72 through 78 are connected in series with one another and are connected to a source of biasing voltage between terminals 80 and 82. This biasing circuit will supply ampere turns of the value shown in FIGURE 2d of one-third $i_n$ which is the net unbalance applied to the cores and will prevent the saturation of these cores.

It is to be noted that windings 72 through 78 of FIGURE 3 which are shown as straight-through windings can be multi-turn windings so that the current supplied by the D.-C. bias circuit may be reduced.

Because of the relatively large current capacity required of the biasing windings of FIGURE 3, it is desirable to combine the balancing windings and the biasing windings in a common winding as shown in FIGURE 4. Thus, in FIGURE 4, the single windings 84, 86, 88 and 90 serve the purpose of both windings 56—72, 58—74, 60—76 and 62—78 respectively of FIGURE 3. In FIGURE 4, the balancing loop is closed through a relatively large capacitor 92, and because the reference current cannot contain a D.-C. component as illustrated in FIGURES 2b, 2c and 2d, a heavy bias is drawn from bias terminals 80 and 82 through a smoothing choke 94.

The circuit of FIGURE 4 is advantageous in improving the regulation characteristic of the system and in partially counter-acting the inductive impedance of the system, but requires a relatively large capacitor 92 to complete the reference circuit and yet isolate the D.-C. bias to the series connected auxiliary windings.

Accordingly, in FIGURE 5, the blocking capacitor 92 is replaced by a diode 96 which produces a D.-C. current component in the reference circuit so that the ampere turns of the power diodes 24 through 30 are inherently cancelled in each reactor at all times. In addition to replacing the blocking capacitor 92, it is clear that diode 96 which permits a D.-C. component in the reference circuit will substantially replace the requirement of an auxiliary source of biasing current. If desired, however, a small D.-C. bias may continue to be applied to the reference circuit for resetting the flux to a far smaller degree than would be required in the circuit of FIGURE 4. This small D.-C. bias circuit is derived from the bias voltage terminals 98 and 100 which are connected to the reference circuit through choke 102. It is to be noted that the bias current through this circuit is small and is equal only to the coercive force of a single reactor of the balancing circuit.

In the system of FIGURE 5, the balancing or reference current is proportioned to the total load current of the power diodes connected in parallel. The operation of this circuit is illustrated in the voltage chart of FIGURE 5a which, as was the case in the chart of FIGURE 2a, illustrates $n$ number of diodes for a circuit of the type shown in FIGURE 5. The direction of residual flux of any of the cores of the circuit of FIGURE 5 at the end of the conductive period will differ in different cores depending upon the magnitude of the forward voltage drop of its associated diodes. Unless the forward voltage drop varies from cycle to cycle, or artifical means are used to change the residual force, the excursion of flux during successive conductive periods will be in the same direction as the coerciving residual flux. The effectiveness of the balancing reactors is, therefore, reduced by saturation of the reactor cores unless the residual flux is reduced to some tolerable value by air gaps in the core structure, or by forming the core of oriented material in cross directions or by other well known means.

In FIGURE 5a, the blocking diode 96 may be considered to have an impedance Z which is equivalent to the impedance Z of FIGURE 2. The voltage drop of the blocking or control diode 96 is reflected into the diode circuits and increases the total voltage drop in the circuits as shown in FIGURE 5a by the value $$\frac{1}{nNv_c}$$

where N is the turns ratio of the auxiliary winding to the reactor.

In FIGURES 5 and 5a, it has been assumed that the direction of magnetizing for any particular reactor will not be continually given and fixed so that a small air gap may be required. If, however, the characteristics of the diodes are known and fixed, the air gap could be replaced by a fixed bias. Since these characteristics are not generally known or fixed, the double reactor core scheme set forth in U.S. Patent No. 2,891,212 issued June 16, 1959 entitled "Current Balancing Transductors for Parallel Connected Diodes" in the name of Francis R. Bingham and assigned to the assignee of the present invention can be used in order to affect a saving in core material.

In addition to this, it is also possible to use a control diode having a higher voltage drop than any of the other diodes to force magnetization of all of the reactor cores in the same direction. Therefore, a single diode could be used for single cores to obtain a maximum utilization of the iron core material. This effect could also be obtained by placing additional impedance in the reference circuit of FIGURE 5 whereby the voltage distribution would be as shown in FIGURE 5b so that the core will always be magnetized in the same direction.

To accomplish this, the impedance must be sufficient to raise the forward drop of the entire bank of diodes and reactors above that of the highest diode drop, so that the core in series with this diode is magnetized in the same direction as the others. The impedance required is determined mathematically as follows:

Let $n$ = the number of diodes in parallel
$N$ = turn ratio of reactor windings
$V_c$ = drop across control diode plus drop across impedances in the balancing loop $$V_{total} = \frac{1}{n} n \sum (v_n + e_n) = V_{av} + \frac{1}{n} n \sum e_n$$

$$V_{av} + \frac{1}{n} \sum e_n > v_{max}$$

or $$\frac{1}{n} \sum e_n > (v_{max} - V_{av})$$

Since $$v_c = \sum e'_n = N \sum e_n$$
$$v_c > nN(v_{max} - V_{av})$$

If the total impedance of the balancing loop is mostly inductive, it will have an appreciable effect on the power factor as well as the regulation of the rectifier, and will produce considerable inverse voltage peaks across the diodes. If the impedance is resistive, the losses will be increased.

If $W_n$ is the power loss in the main power diodes, $w_{max}$ the loss in the diode with the maximum voltage drop, and $W_c$ the loss in the balancing loop, it can easily be shown from the relationships above, that the total power loss must be at least $nW_{max}$, an increase of $$W_c > nw_{max} - W_n$$

or $$\left(\frac{v_{max}}{V_{av}} - 1\right) W_n$$

This relationship is undesirable and may be overcome again by the double reactor set forth in above noted U.S. Patent No. 2,891,212. This circuit is set forth in FIGURE 6 where the individual reactor cores are replaced by a stamped lamination sheet as proposed in copending application (C-796) Serial No. 733,152 filed May 5, 1958 entitled "Current Balancing Reactors for Diodes" in the names of Otto Jensen and Isadore K. Dortort and assigned to the assignee of the present invention.

More specifically, the circuit of FIGURE 6 illustrates a group of diodes 104, 106, 108, 110 and 112 which are associated with reactor cores formed by a first schematically illustrated stack of punched lamination sheets 114 and a second stack of lamination sheets 116. Each of the diode conductors associated with diodes 104 through 112 pass through stamped openings such as openings 118 of stack 114 and 120 of stack 116. Accordingly, each of the conductors associated with the various diodes serve as windings for two reactor cores. Each of the reactor cores formed by stacks 114 and 116 additionally receive auxiliary windings such as the straight-through auxiliary winding 122 which passes through opening 118 and serves as a winding magnetically coupled to the diode conductor 104 and winding 124 which is magnetically coupled to the same diode conductor and passes through opening 120.

The various auxiliary windings such as auxiliary windings 122 and 124 are then connected in a closed circuit through the blocking diode 126 as was the case in the circuit of FIGURE 5. A D.-C. bias is superimposed upon the auxiliary windings and is connected from positive terminal 128 through diodes 130 for the upper reactor cores formed by stack 114 and diode 132 for the reactor cores formed by stack 116 to the negative bias terminal 134. It is to be noted that in the self-contained loop forming the reference circuit of FIGURE 6 that the upper bus 136 or lower bus 138 may be used as the return conductor.

FIGURE 7 illustrates the manner in which the circuit of FIGURE 6 may be modified to a "driven balance loop arrangement" wherein the current is driven through the balancing circuit by the voltage drop across the power diodes and the reference circuit carries a portion of the total power current. In this circuit, as analyzed in FIGURE 7a, although two reactors are used with each diode, one of these reactors will always be saturated in the wrong direction and will have no effect on the balancing, having essentially no voltage drop or induced voltage. If the voltage $v_c$ were increased in the circuit of FIGURE 7, and as shown in FIGURE 8, all of the reactors will be magnetized in the same direction and may, therefore, be predictably reset by an identical bias, the double reactor construction is not necessary.

It should also be noted that the bias voltage between terminals 128 and 134 of FIGURES 6 and 7 can be in the form of D.-C., pulsating D.-C. or A.-C. provided that the pulsating or A.-C. bias is properly phased. In a large three-phase bridge rectifier having a high voltage rating, each bank of diodes will be at a different potential. Therefore, it will be easier to use the aforementioned A.-C. diodes supplied through a multi-secondary transformer rather than separate D.-C. power supplies.

Another form which the reference circuit may take is that shown in FIGURE 9. In FIGURE 9, the self-contained balancing loop is used with the D.-C. bus being used as the return lead of the closed loop. More specifically, in FIGURE 9, the negative bus 140 is connected to the positive bus 142 by means parallel connected diodes 144, 146, 148, 150 and 152. The diode conductors associated with diodes 144 through 152 operate as has been described previously as a first winding for reactor cores 154, 156, 158, 160 and 162 respectively. The reference circuit for achieving the current balancing then comprises the auxiliary windings 164, 166, 168, 170 and 172 which are connected in a closed series arrangement with the control diode 174. Clearly, the operation of this circuit proceeds in the manner previously described for the other circuits, but is simple in construction. If desired, the impedance drop in the circuit along bus 142 may be used to partially neutralize the impedance of the balancing circuit. Since there is no other source of bias, the reactor cores must have low residual magnetism.

A further embodiment of the invention following the concept of FIGURE 9 is set forth in FIGURE 10 wherein elements similar to those of FIGURE 9 are given similar identifying numerals. In FIGURE 10, however, the single core construction of FIGURE 9 is replaced by a double core construction of the aforementioned U.S. Patent No. 2,891,212 where, for example, core 154 of FIGURE 9 is replaced by the two cores 176 and 178. In addition to this, each of the double cores of FIGURE 10 have a flux resetting bias applied thereto which is obtained from the inverse voltage of the power diodes. Thus, the bias circuit includes auxiliary windings of the double core reactors such as winding 180 of core 176 and winding 182 of core 178. All of these auxiliary windings are connected in series with one another with the circuit terminating at buses 140 and 142. The circuit may additionally contain a control impedance 184 as shown.

Note that this system for obtaining a bias would be applicable to both a driven balancing loop of the type shown in FIGURE 7 as well as to the self-contained type of balancing loop as shown in FIGURE 10. Similarly, this type of bias may be used in a single core reactor construction when the impedance of the reference loop is sufficiently high to force magnetization of all of the reactors in the same direction.

In the case of the self-contained balancing loop as shown in FIGURE 10, the core bias must be obtained from an isolated bias winding. In the driven type of balancing or reference circuit, it is possible to use the inverse voltage of the diodes as a source of bias without requiring the additional bias winding needed in the self-contained circuit. This is shown in FIGURE 11 where circuit components similar to those of FIGURE 10 have been given similar identifying numerals.

In FIGURE 11, the driven bias is obtained through the circuit including the additional diode 186 and the circuit including resistors 188 and 190. As illustrated by the arrows, this auxiliary circuit will generate a current $i_c$ through the combination biasing and balancing auxiliary windings.

As previously described in FIGURES 6 and 7, the reactor construction can be formed of flat laminations having punched holes therein. If desired, the reactors may be made of spiral wound oriented steel to obtain a shorter magnetic length and lower magnetizing currents. For example, in FIGURE 12, the reactor is shown as comprising a spiral wound core 192 having a central opening for receiving a diode conductor 194 and a balancing conductor 196 which is a conductive cylinder concentrically positioned with respect to conductor 194. A conductive bus member 198 is connected to the balance conductor at its bottom and a second conductor 200 is connected to the top of conductive cylinder 196. Clearly, buses 198 and 200 are to be connected to the conductive cylinders of adjacent reactors associated with diodes connected in parallel with the diode connected to conductor 194.

An alternative to the construction of FIGURE 12 is shown in FIGURE 13 where the spiral core 192 receives conductor 194 and the balancing conductor is formed of a conductor 202 which is positioned adjacent conductor 194 rather than being concentric therewith. As in the case of FIGURE 12, conductors 198 and 200 extend from the upper and lower parts of conductor 202 for connection to the balancing conductor of adjacent parallel circuits.

When physically positioning reactors having the construction of FIGURES 12 and 13, if the reactors are arranged in a single line with all of the diode conductors carrying current in the same direction, the balancing circuit is required to run from front to back of successive reactors so as to greatly increase the impedance of the circuit.

To overcome this objection, and as is shown in FIGURE 14, the diodes may be located alternatively on opposite sides of the reactor assembly. Note that the electrical circuit of FIGURE 14 is similar to that of FIGURE 7. Referring to FIGURE 14, four diodes 204, 206, 208 and 210 are connected in parallel between the bifurcated buses 212 and 214. The double reactor structure including reactor cores 216 and 218 for diode 204 have auxiliary windings 220 and 222 and the double reactor cores for the remaining power diodes have similar auxiliary windings.

With the specific physical arrangement of FIGURE 14, however, the balancing conductors of the balancing or reference circuit run in a straight line from the front of one reactor to the front of the adjacent reactor, then through that reactor to the back and then in a straight line to the back of the next adjacent conductor. This results in substantial simplicity in mounting and manufacturing and additionally gives a minimum impedance in the balancing or reference circuit.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A current balancing circuit for plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit.

2. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; each of said reactors having a relatively large air gap to prevent saturation of said reactor cores.

3. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor.

4. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; each of said reactors having a relatively large air gap to prevent saturation of said reactor cores; said closed series circuit serving as a common reference circuit for balancing the current through each of said first windings of said reactor.

5. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said reactor cores having a relatively high permeability; a second auxiliary winding for each of said reactors; said second windings being connected in series and having a D.-C. bias applied thereto to prevent saturation of said reactor cores.

6. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor; said reactor cores having a relatively high permeability; a D.-C. bias for preventing saturation of said cores; said D.-C. bias being connected to said auxiliary windings and in said reference circuit.

7. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor; said reference circuit having a capacitor connected therein; a D.-C. bias; said D.-C. bias being connected across said capacitor and delivering D.-C. current to said auxiliary windings.

8. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common refernce circuit for balancing the current through each of said first windings of said reactor; said reference circuit having a control diode connected in series therewith.

9. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor; said reference circuit having a control diode connected therein; said control diode establishing a D.-C. bias in said reference circuit for preventing saturation of said reactor cores.

10. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor; said reference circuit having a control diode connected therein; said control diode establishing a D.-C. bias in said reference circuit for preventing saturation of said reactor cores; the impedance of said control diode being substantially higher than the impedance of any of said plurality of parallel connected diodes to force voltages of the same polarity to develop across said first windings.

11. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; each of said reactor cores being formed by a stack of stamped laminations having openings for receiving said first and auxiliary windings.

12. A current balancing circuit for a plurality of diodes; each of said diodes having a respective conductor associated therewith and being series connected to a first common terminal; the other end of said conductors being electrically connected to a second common terminal each of said conductors having a reactor core associated therewith and acting as a first winding for said reactor; each of said reactors having an auxiliary winding; each of said reactor auxiliary windings being connected together in a closed series circuit; said closed series circuit serving as a common reference circuit for balancing the current through each of said first windings of said reactor; said reference circuit having a control diode connected therein; said control diode establishing a D.-C. bias in said reference circuit for preventing saturation of said reactor cores; each of said reactor cores including a first and second portions; said first and second portions being biased in opposite directions; at least one of said first and second portions remaining unsaturated during the conducting period of the diode of said plurality of diodes associated therewith.

13. In a system for exchanging energy between an A.-C. and D.-C. system; a plurality of parallel connected diodes connected in series with said A.-C. system and said D.-C. system; each of said plurality of diodes having a conductor extending from one end thereof and terminating on a first common bus and having their other ends terminating on a second common bus; a current balancing system for balancing the current flow between each of said plurality of parallel connected diodes; said current balancing system including a respective reactor core for each of said diodes; each of said reactor cores having a first winding formed by said conductor of their said respective diodes and an auxiliary winding; each of said auxiliary windings being connected in series.

14. In a system for exchanging energy between an A.-C. and D.-C. system; a plurality of parallel connected diodes connected in series with said A.-C. system and said D.-C. system; each of said plurality of diodes having a conductor extending from one end thereof and terminating on a first common bus and having their other ends terminating on a second common bus; a current balancing system for balancing the current flow between each of said plurality of parallel connected diodes; said current balancing system including a respective reactor core for each of said diodes; each of said reactor cores having a first winding formed by said conductor of their said respective diodes and an auxiliary winding; each of said auxiliary windings being connected in series; said series connected auxiliary windings forming a reference circuit for forcing a balanced current distribution between each of said diodes.

15. In a system for exchanging energy between an A.-C. and D.-C. system; a plurality of parallel connected diodes connected in series with said A.-C. system and said D.-C. system; each of said plurality of diodes having a conductor extending from one end thereof and terminating on a first common bus and having their other ends terminating on a second common bus; a current balancing system for balancing the current flow between each of said plurality of parallel connected diodes; said current balancing system including a respective reactor core for each of said diodes; each of said reactor cores having a first winding formed by said conductor of their said respective diodes and an auxiliary winding; each of said auxiliary windings being connected in series; said series connected auxiliary windings forming a reference circuit for forcing a balanced current distribution between each of said diodes; said reference circuit including a control diode; said control diode being connected in a direction to permit current flow through said reference circuit in a direction to generate ampere turns in said reactor cores in a direction opposite to the ampere turns generated by current flow through said diodes connected to said conductors.

16. In a system for exchanging energy between an A.-C. and D.C. system; a plurality of parallel connected diodes connected in series with said A.-C. system and said D.-C. system; each of said plurality of diodes having a conductor extending from one end thereof and terminating on a first common bus and having their other ends terminating on a second common bus; a current balancing system for balancing the current flow between each of said plurality of parallel connected diodes; said current balancing system including a respective reactor core for each of said diodes; each of said reactor cores having a first winding formed by said conductor of their said respective diodes and an auxiliary winding; each of said auxiliary windings being connected in series; said series connected auxiliary windings forming a reference circuit for forcing a balanced current distribution between each of said diodes; said reference circuit further including at least a portion of said second common bus.

17. In a system for exchanging energy between an A.-C. and D.-C. system; a plurality of parallel connected diodes connected in series with said A.-C. system and said D.-C. system; each of said plurality of diodes having a conductor extending from one end thereof and terminating on a first common bus and having their other ends terminating on a second common bus; a current balancing system for balancing the current flow between each of said plurality of parallel connected diodes; said current balancing system including a respective reactor core for each of said diodes; each of said reactor cores having a first winding formed by said conductor of their said respective diodes and an auxiliary winding; each of said auxiliary windings being connected in series; said series connected auxiliary windings forming a reference circuit for forcing a balanced current distribution between each of said diodes; said reference circuit including a control diode; said control diode being connected in a direction to permit current flow through said reference circuit in a direction to generate ampere turns in said reactor cores in a direction opposite to the ampere turns generated by current flow through said diodes connected to said conductors; said reference circuit further including at least a portion of said second common bus.

References Cited in the file of this patent

UNITED STATES PATENTS

| | | |
|---|---|---|
| 1,270,805 | Fortescue | July 2, 1918 |
| 2,092,319 | Logan | Sept. 7, 1937 |
| 2,828,461 | Pokorny | Mar. 25, 1958 |

FOREIGN PATENTS

| | | |
|---|---|---|
| 1,007,941 | France | Feb. 13, 1952 |